United States Patent
Lin et al.

(10) Patent No.: US 8,515,359 B2
(45) Date of Patent: Aug. 20, 2013

(54) METHOD AND APPARATUS TO PROVIDE LOW COST TRANSMIT BEAMFORMING FOR NETWORK DEVICES

(75) Inventors: Xintian E. Lin, Mountain View, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1976 days.

(21) Appl. No.: 11/076,195

(22) Filed: Mar. 9, 2005

(65) Prior Publication Data
US 2006/0234645 A1    Oct. 19, 2006

(51) Int. Cl.
*H04B 1/00* (2006.01)
(52) U.S. Cl.
USPC .......... 455/69; 455/68; 375/265; 375/267
(58) Field of Classification Search
USPC ........................................................ 455/69
See application file for complete search history.

(56) References Cited

U.S. PATENT DOCUMENTS

| | | | | |
|---|---|---|---|---|
| 6,891,897 | B1 * | 5/2005 | Bevan et al. | 375/265 |
| 7,076,263 | B2 * | 7/2006 | Medvedev et al. | 455/522 |
| 7,260,153 | B2 * | 8/2007 | Nissani (Nissensohn) | 375/259 |
| 7,444,170 | B2 * | 10/2008 | Karabinis | 455/562.1 |
| 2004/0165684 | A1 * | 8/2004 | Ketchum et al. | 375/343 |
| 2005/0157807 | A1 * | 7/2005 | Shim et al. | 375/267 |
| 2005/0227628 | A1 * | 10/2005 | Inanoglu | 455/68 |
| 2005/0265275 | A1 * | 12/2005 | Howard et al. | 370/328 |
| 2006/0014499 | A1 * | 1/2006 | Gorokhov et al. | 455/102 |
| 2006/0098754 | A1 * | 5/2006 | Kim et al. | 375/267 |
| 2006/0222101 | A1 * | 10/2006 | Cetiner et al. | 375/267 |
| 2008/0316987 | A1 * | 12/2008 | Trainin et al. | 370/338 |

* cited by examiner

*Primary Examiner* — Ajibola Akinyemi
(74) *Attorney, Agent, or Firm* — Thorpe North & Western, LLP

(57) ABSTRACT

Techniques and structures for use in generating an approximated beamforming matrix in a MIMO based system are disclosed. The techniques and structures may be used to allow closed loop MIMO beamforming to be performed within a device that does not include singular value decomposition (SVD) circuitry.

28 Claims, 6 Drawing Sheets

METHOD AND APPARATUS TO PROVIDE LOW COST TRANSMIT BEAMFORMING FOR NETWORK DEVICES

TECHNICAL FIELD

The invention relates generally to wireless communication and, more particularly, to techniques and structures for implementing closed loop MIMO in a wireless network.

BACKGROUND OF THE INVENTION

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link. MIMO may be performed as either an open loop or a closed loop technique. In open loop MIMO, the transmitter has no specific knowledge of the condition of the channel before data signals are transmitted to the receiver. In closed loop MIMO, on the other hand, the transmitter uses channel-related information to precondition transmit signals before they are transmitted to better match the present channel state. In this manner, performance may be improved and/or receiver processing may be simplified. There is a need for techniques and structures for efficiently implementing closed loop MIMO in wireless networks.

DETAILED DESCRIPTION

Figure 1:
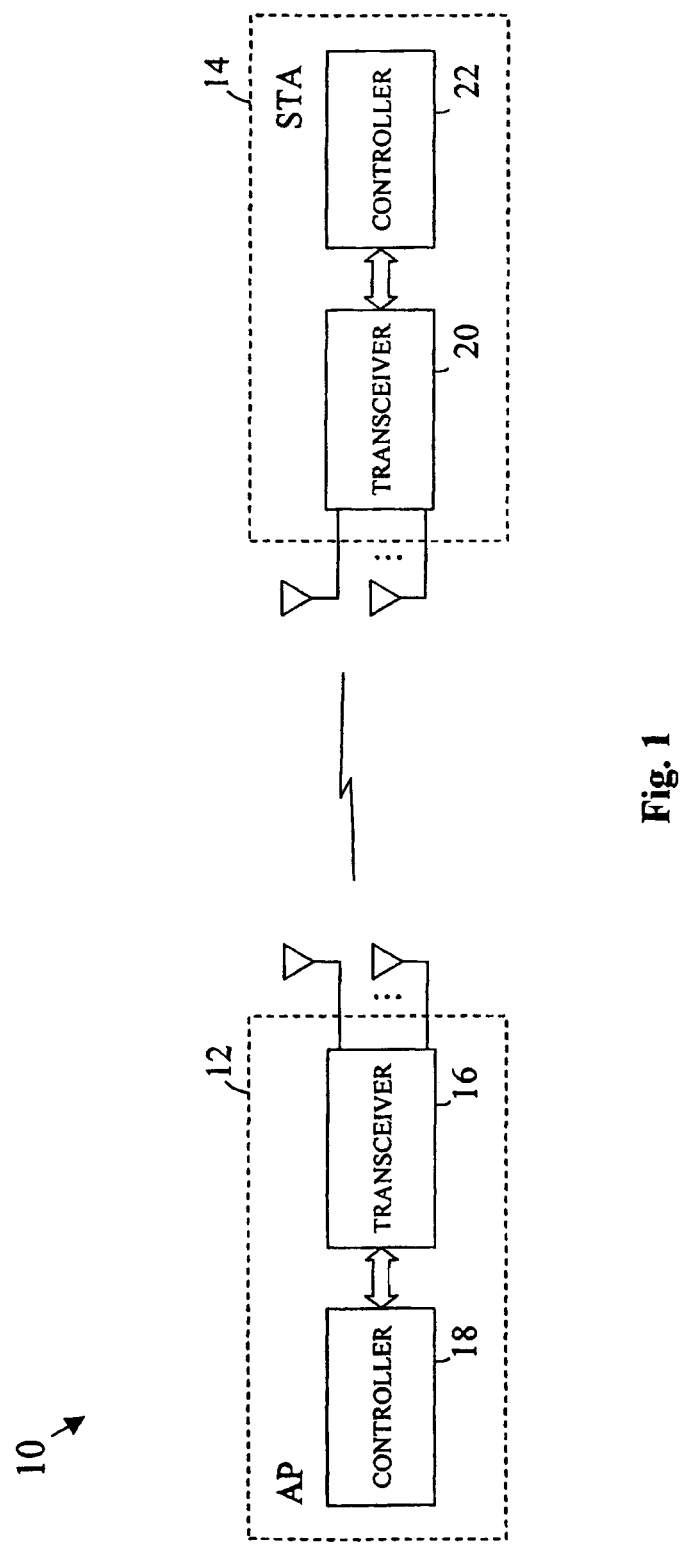
FIG. 1 is a block diagram illustrating an example wireless networking arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless networking arrangement 10 in accordance with an embodiment of the present invention. As illustrated, a wireless access point (AP) 12 is communicating with a wireless station (STA) 14 via a wireless communication link. The wireless AP 12 may be providing access to a larger network (wired and/or wireless) for the STA 14. The STA 14 may include any type of wireless component, device, or system that is capable of accessing a network through a remote wireless access point. Although only a single STA is shown in FIG. 1, it should be appreciated that the wireless AP 12 may be capable of providing access services to multiple STAs simultaneously. As illustrated, the wireless AP 12 and the STA 14 each have multiple (i.e., two or more) antennas. Any type of antennas may be used including, for example, dipoles, patches, helical antennas, and/or others. The wireless channel between the AP 12 and the STA 14 is a multiple input, multiple output (MIMO) channel.

In the embodiment of FIG. 1, the wireless AP 12 includes a wireless transceiver 16 and a controller 18. The controller 18 is operative for carrying out the digital processing functions required to support closed loop MIMO operation for the AP. The controller functions may be carried out using, for example, one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The controller 18 may also include one or more discrete digital elements such as, for example, bit interleavers, bit de-interleavers, modulation units, demodulation units, discrete Fourier transform units, inverse discrete Fourier transform units, etc. The wireless transceiver 16 is operative for performing the radio frequency (RF) related functions required to (a) generate RF transmit signals for delivery to the multiple antennas during transmit operations and (b) process the RF signals received by the multiple antennas during receive operations. Separate transmit and receive chains may be provided within the transceiver 16 for each corresponding antenna. Digital to analog converters and analog to digital converters may be used in the interface between the controller 18 and the transceiver 16. The STA 14 of FIG. 1 also includes a wireless transceiver 20 and a controller 22. These elements may perform functions similar to the corresponding units within the AP 12 (although the AP will typically be capable of supporting multiple simultaneous wireless connections while the STA may only be capable on supporting one).

In at least one embodiment, the AP 12 and the STA 14 may be capable of operation using orthogonal frequency division multiplexing (OFDM) techniques. In an OFDM system, data to be transmitted is distributed among a plurality of substantially orthogonal, narrowband subcarriers. The AP 12 and/or the STA 14 may also be capable of operation using a form of MIMO known as SVD (i.e., singular value decomposition) MIMO. SVD MIMO will be discussed in greater detail below. To facilitate understanding and simplify notation, the discussion that follows may be with respect to a single subcarrier in an OFDM system. It should be appreciated that the below described functions may need to be performed for each of the subcarriers within a multi-carrier system. Interpolation between subcarriers may also be used to reduce the amount of calculation.

In a MIMO-based system, a wireless channel may be characterized using an $n_{RX} \times n_{TX}$ channel matrix H, where $n_{RX}$ is the number of receive antennas and $n_{TX}$ is the number of transmit antennas. Using SVD, the channel matrix H may be decomposed as follows:

$$H = UDV^H \quad \text{(Equation 1)}$$

where U and V are unitary matrices (i.e., matrices with orthonormal columns and unit amplitude), D is a diagonal matrix, and $V^H$ is the Hermitian of unitary matrix V. A unitary matrix Q has the following property:

$$Q^H Q = I$$

where I is the identity matrix. In the channel matrix decomposition set out above, the matrix V may be referred to as the beamforming matrix (precoder). This beamforming matrix V may be generated by first determining the channel matrix H for the MIMO channel and then decomposing the matrix H using SVD techniques (or other similar techniques). The beamforming matrix V may then be used to process a subsequent transmit signal to be transmitted through the MIMO channel. A separate matrix V may be required for each subcarrier in a multicarrier system.

The elements of the diagonal matrix D are known as the singular values, or eigenvalues, of the channel matrix H. The beamforming matrix V is made up of a number of column vectors, known as eigenvectors, that correspond to the eigenvalues. Each of the eigenvectors may define a spatial channel (or eigenmode) within the MIMO channel. The stream of data flowing through a particular spatial channel is known as a spatial stream. The eigenvalues will typically be indicative of the relative strength of the corresponding eigenvectors/spatial channels. Sometimes, it may be advantageous to limit a MIMO transmission to only the strongest of the available spatial channels (e.g., to the spatial channels associated with the 2 largest eigenvalues).

In at least one embodiment of the present invention, a closed loop MIMO channel is provided that utilizes implicit feedback techniques. Implicit feedback relies on the property of channel reciprocity to obtain information about the MIMO channel within a transmitting device. Implicit feedback requires calibrations to be performed for the transmitting device and the receiving device to accurately model the overall channel as a reciprocal component. After calibrations have been accomplished, training signals may be transmitted from the receiving device to the transmitting device to allow the transmitting device to calculate channel information for the reverse channel. The reciprocal property of the channel may then be used to determine the channel information in the forward direction from the transmitting device to the receiving device.

With reference to FIG. 1, the wireless downlink channel from the antennas of the AP 12 to the antennas of the STA 14 may be characterized using a channel matrix H. In the uplink direction, from the antennas of the STA 14 to the antennas of the AP 12, the wireless channel may be characterized as the transpose of the channel matrix H (i.e., $H^T$), based on channel reciprocity. In each direction, the overall channel will also include components from within the devices themselves (i.e., the AP 12 and the STA 14). For example, in the downlink direction, the overall channel may be expressed as:

$$H^d = \beta_{STA} H \alpha_{AP}$$

where $\alpha_{AP}$ is a component characterizing a transmitter portion of the AP, H is the channel matrix from the transmit antennas to the receive antennas, and $\beta_{STA}$ is a component characterizing a receiver portion of the STA. Likewise, in the uplink direction, the overall channel may be expressed as:

$$H^u = \beta_{AP} H^T \alpha_{STA}$$

where $\alpha_{STA}$ is a component characterizing a transmitter portion of the STA, $H^T$ is the channel matrix from the transmit antennas to the receive antennas in the uplink direction, and $\beta_{AP}$ is a component characterizing a receiver portion of the AP. The calibrations discussed above for implicit feedback systems may be performed to determine values for $\alpha_{AP}$, $\beta_{STA}$, $\alpha_{STA}$, and $\beta_{AP}$. Once these parameters have been determined, the overall downlink channel may be determined by: (a) transmitting training data from the STA 14 to the AP 12, (b) using the training data within the AP 12 to determine the overall wireless channel matrix $H^u = \beta_{AP} H^T \alpha_{STA}$, (c) performing a transpose operation on $H^u$, (d) using $\alpha_{STA}$ and $\beta_{AP}$ to generate the wireless channel matrix H ($H = \beta_{AP}^{-1} H^u \alpha_{STA}^{-1}$), and (e) using $\beta_{STA}$ and $\alpha_{AP}$ to generate the overall downlink channel ($H^d = \beta_{STA} H \alpha_{AP}$). In another embodiment, circuit compensations may be conducted to remove the effect of $\alpha_{AP}$, $\beta_{STA}$, $\alpha_{STA}$, and $\beta_{AP}$. Namely, the compensations set the matrixes to be scaled identity matrixes. In this case, the channel matrix up to a global scaling factor can be directly obtained from the received channel training data (with only transpose operation) without additional processing related to $\alpha_{AP}$, $\beta_{STA}$, $\alpha_{STA}$, and $\beta_{AP}$. After a channel matrix has been determined for the overall downlink channel, a beamforming matrix V may be determined by performing an SVD operation on the channel matrix. The beamforming matrix V may then be used to develop transmit signals for delivery into the MIMO channel from the AP 12. A similar process may be used to determine the channel matrix and beamforming matrix for the uplink channel.

In the procedure outlined above, an SVD operation is performed on the channel matrix to determine the beamforming matrix V for use in generating transmit signals. The SVD operation is often performed by specialized SVD circuitry and usually requires several iterations to complete. The presence of SVD circuitry increases the silicon cost of an implementing system and also increases overall power consumption. The computational latency of the SVD circuits may be reduced by increasing the gate count of the circuitry, but this further increases the silicon cost. Because of the cost, power consumption, and/or computational latency of SVD circuits, it may be undesirable to include such structures within certain types of network devices (e.g., STA devices, etc.). In at least one aspect of the present invention, a lower cost alternative is provided for determining a beamforming matrix within a wireless device, component, or system.

In the IEEE 802.11n high throughput wireless networking standard that is currently in development, it is believed that open loop MIMO capability will be mandatory. As described previously, in a system implementing open loop MIMO, a transmitting device generally has no specific knowledge of the condition of the channel before transmitting data signals to a receiving device. The receiving device will typically include a linear filter, such as a minimum mean square error (MMSE) filter or a zero-forcing filter, to process the received signal to recover the transmitted data. In conceiving the present invention, it was appreciated that the linear filter that is present within a device to perform open loop MIMO receive functions may be leveraged for use during closed loop MIMO operation to determine an estimate or approximation of a beamforming matrix V for use by the device during a subsequent transmit operation. In this manner, a STA (or other network device, component, or system) that does not include SVD circuitry may still be able to perform closed loop MIMO transmit beamforming by taking advantage of circuitry that is already available for use in open loop MIMO operation.

Figure 2:
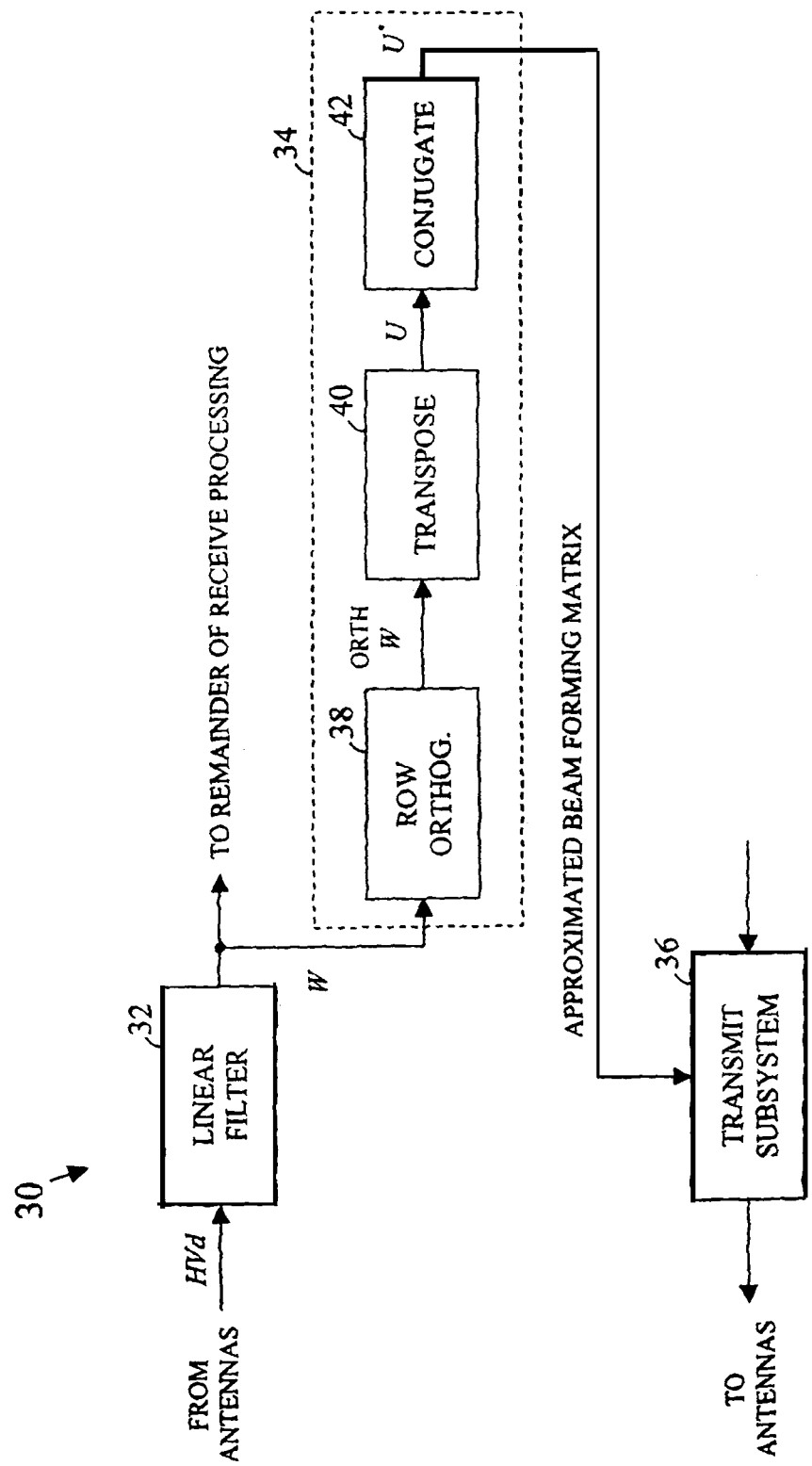
FIG. 2 is a block diagram illustrating an example processing arrangement in accordance with an embodiment of the present invention.

FIG. 2 is a block diagram illustrating an example processing arrangement 30 in accordance with an embodiment of the present invention. The processing arrangement 30 may be implemented within any type of network device including, for example, STAs, APs, and others. In the discussion that follows, it will be assumed that the processing arrangement 30 is within a STA. As illustrated, the processing arrangement 30 includes: a linear filter 32, a beamforming matrix estimator 34, and a transmit subsystem 36. A group of local antennas receives signals from a remote AP through a MIMO channel. The linear filter 32 processes these received signals to generate an output matrix. The linear filter 32 may include, for example, an MMSE or zero-forcing filter. The output of the linear filter 32 will typically need to undergo further receive processing to extract the useful data from the received signals. During closed loop MIMO operation, the output matrix of the linear filter 32 may also be directed to the beamforming matrix estimator 34 for use in developing an approximated beamforming matrix for use in the uplink channel. The approximated beamforming matrix may then be delivered to a transmit subsystem 36 for use in developing transmit signals for transmission to the AP via the uplink channel.

As illustrated in FIG. 2, in at least one embodiment, the beamforming matrix estimator 34 includes: a row orthogonalizer 38, a transpose function 40, and a conjugation function 42. During closed loop operation, the remote AP may multiply a vector of data symbols d by a beamforming matrix V to generate a transmit signal vector x for transmission from multiple antennas (i.e., x=Vd). The transmit vector x will then be acted upon by the channel H and received by the antennas associated with processing arrangement 30. The received signal (i.e., HVd) is directed to the linear filter 32 for processing. For a zero-forcing receiver, the linear filter 32 computes the inverse of the combined channel HV to generate output matrix W=(HV)$^{-1}$. From Equation 1, the matrix W may be expressed as follows:

$$W=(HV)^{-1}=(UD)^{-1}=D^{-1}U'$$

where U' is the conjugate transpose of matrix U. For an MMSE receiver, the linear filter 32 computes:

$$W = [(HV)'(HV) + \sigma^2 I]^{-1}(HV)' = \underbrace{[D'D + \sigma^2 I]^{-1}D'}_{P}U'.$$

where denotes the operation of conjugate transpose and P is a diagonal matrix. Seen from the two equations above, the output matrix W is the product of a diagonal matrix on the left and a unitary matrix U' on the right for both zero-forcing and MMSE receivers. As H is the channel matrix for the downlink channel, the channel matrix for the uplink channel is H$^T$ for per antenna training and (HV)$^T$, for per stream training. For both of these cases, the beamforming matrix of the STA will be the same. The following discussion will focus on per antenna training. It is assumed that the implicit feedback calibrations and compensations discussed above have been performed for both the STA and the AP. The SVD of the channel matrix in the reverse direction (H$^T$) is as follows:

$$H^T=V^*DU^T.$$

Thus, the beamforming matrix of the STA is the conjugate of matrix U (i.e., U*). The row orthogonalizer 38, the transpose function 40, and the conjugation function 42 may be used to estimate U* using the output of the linear filter 32 as follows. The row orthogonalizer 38 first orthogonalizes the rows of matrix W. Any orthogonalization technique may be used including, for example, QR decomposition, Gram-Schmidt orthogonalization, and/or others. The output of row orthogonalizer 38 is a unitary matrix having rows that are orthogonal to each other and that each have a unity norm. For the case where the exact V matrix is applied by the AP, the rows of W computed by the STA are already orthogonal to each other for both zero-forcing and MMSE receivers. In this case, only normalization of the rows of W is needed in the row orthogonalizer 38. The transpose function 40 takes the transpose of the orthogonalized matrix W to approximate the matrix U. The conjugate function 42 may then be used to approximate the conjugate of matrix U (i.e., U*), which is the beamforming matrix to be used by the STA. For the case where V is applied by the AP and a zero-forcing (or MMSE) receiver is employed by the STA, the approximation is exact. As described above, this estimate may be delivered to the transmit subsystem 36 for use in developing transmit signals to be transmitted to the AP via the local antennas. It should be appreciated that the physical order of the row orthogonalizer 38, the transpose function 40, and the conjugation function 42 in FIG. 2 may be changed while still achieving the desired result.

Figure 3:
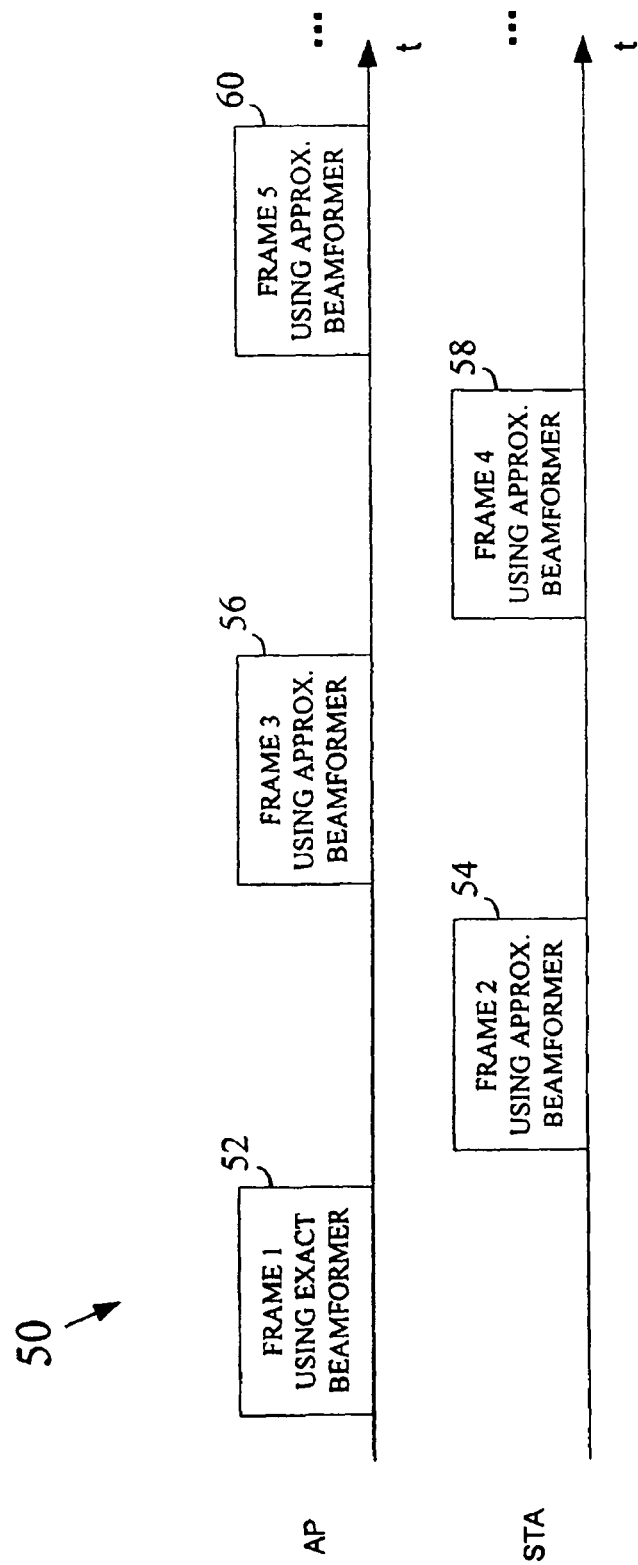
FIG. 3 is a signal diagram illustrating an example continuous frame exchange sequence that may be used within a wireless network in accordance with an embodiment of the present invention.

In at least one scenario, a wireless AP in a network will be outfitted with SVD circuitry and a STA in the network will not have SVD circuitry. The STA may thus use the above-described technique to perform closed loop beamforming in the uplink direction. The AP, on the other hand, may also make use of the estimation technique, even if it has SVD circuitry available. This may be done to, for example, reduce the overall computation complexity and/or energy consumption within the AP. The use of an approximation may also improve computational latency in the AP. FIG. 3 is a signal diagram illustrating an example continuous frame exchange sequence 50 that may be used within a wireless network in accordance with an embodiment of the present invention. The frame exchange is between a wireless AP and a STA in the network. The upper portion of the diagram represents the transmissions of the wireless AP and the lower portion represents the transmissions of the STA. The wireless AP and the STA both include multiple antennas. The wireless AP has SVD circuitry on-board. As illustrated, the AP transmits a first frame 52 to the STA using an exact beamforming matrix. Although not shown, a training exchange may have preceded the first frame 52 of the frame exchange sequence 50, during which the exact beamforming matrix V was generated. As used herein, the term "exact" beamforming matrix means a beamforming matrix that is generated based on actual channel training using SVD circuitry, as opposed to an approximated beamforming matrix as described above.

After receiving the first frame 52, the STA may transmit a second frame 54 using an approximated beamforming matrix. The approximated beamforming matrix may be generated as described above using a zero forcing filter, an MMSE filter, or some other form of linear filter having the requisite properties. The second frame 54 may be, for example, an acknowledgement (ACK) frame. In at least one embodiment, the second frame 54 may also include, among other things, reverse direction user data. After receiving the second frame 54, the AP may transmit a third frame 56 using an approximated beamforming matrix. That is, instead of generating another "exact" beamforming matrix, the AP may use an on-board zero forcing filter or MMSE filter to generate an approximated beamforming matrix, as described above, for use in transmitting the third frame 56. The STA and the AP may then both use approximated beamforming matrices for the remainder of the frame exchange sequence 50 (e.g., fourth frame 58, fifth frame 60, and so on). As long as the channel is not changing too rapidly, the approximated beamforming matrices generated by both the AP and the STA should remain relatively accurate. In another approach, the AP may always use an exact beamforming matrix during the frame exchange sequence 50, generated using the on-board SVD circuitry.

The approximation of the ideal beamforming matrix can be checked by the receiver that receives the beamformed signals. For example, in the above example, the AP can check the crosstalk (or orthogonality) between rows of the matrix W that the AP computes. If the AP finds that the crosstalk exceeds a certain level, then the approximation (of the beamforming matrix) of the STA may not be accurate enough. This may be due to the fact that the approximation at the AP is not accurate. The AP can activate its SVD circuit to compute the exact beamforming matrix for the downlink. This will bring back the accuracy for both downlink and uplink.

In general, if one side of a link employs an exact beamforming matrix and the other side employs a zero-forcing or MMSE receiver as described above to generate an approximation, the approximation on the receiver side will be close to exact. Because the approximation is close to exact, the beamforming in the return link also employs the exact beamforming matrix. The accuracy of beamforming should continue during the exchange sequence if the channel remains the same. If the channel changes or the channel estimation is corrupted by noise, the approximation of the beamforming matrix will not be exact. In at least one embodiment of the present invention, the side of the link with the SVD circuitry may occasionally check the accuracy of the approximation by checking the crosstalk between the rows of W, and recover the accuracy with an exact beamforming matrix in the return link by activating the SVD circuit.

Figure 4:
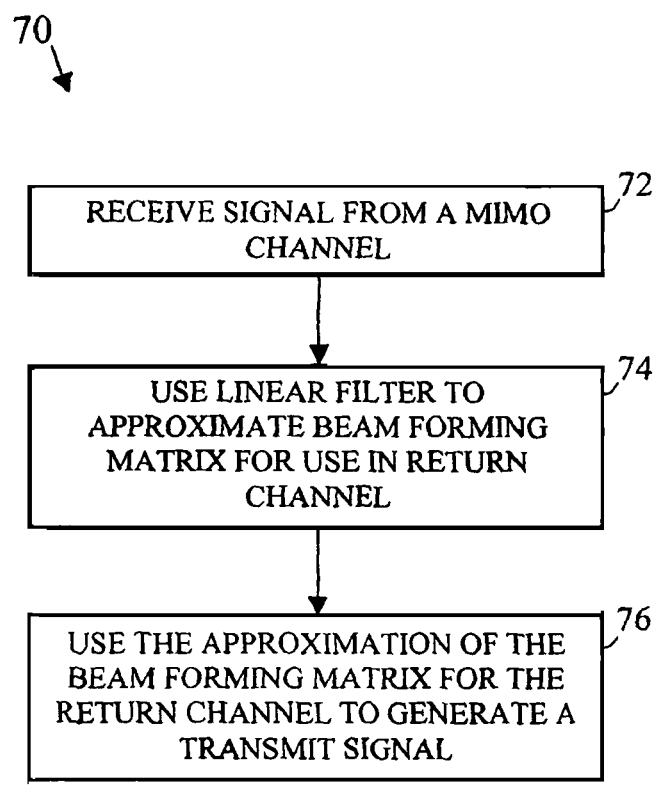
FIG. 4 is a flowchart illustrating an example method for use in supporting closed loop MIMO operation in a wireless network in accordance with an embodiment of the present invention.

FIG. 4 is a flowchart illustrating an example method 70 for use in supporting closed loop MIMO operation in a wireless network in accordance with an embodiment of the present invention. The method 70 may be practiced in connection with, for example, a STA or AP within a wireless network. First, a signal is received from a wireless MIMO channel at multiple antennas (block 72). A linear filter is then used to process the received signal to facilitate the approximation of a beamforming matrix for use in the return channel (block 74). The linear filter may include, for example, a zero-forcing filter, an MMSE filter, and/or others. The approximated beamforming matrix may then be used to generate transmit signals for transmission in the return MIMO channel (block 76).

Figure 5:
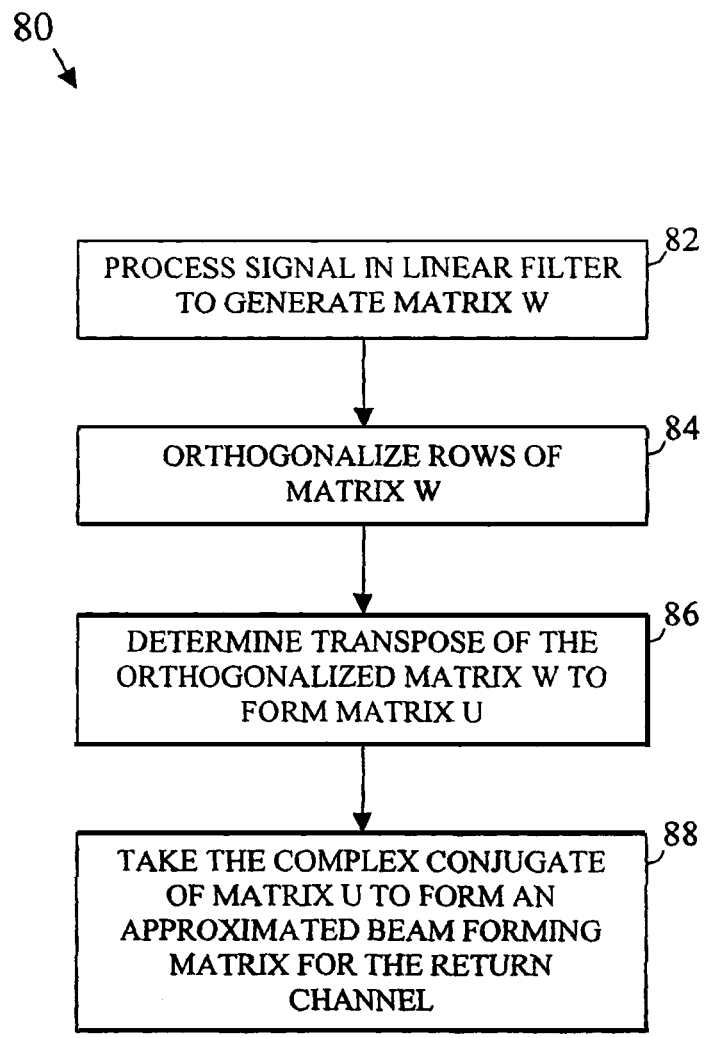
FIG. 5 is a flowchart illustrating an example method for use in generating an approximated beamforming matrix using a linear filter in accordance with an embodiment of the present invention.

FIG. 5 is a flowchart illustrating an example method 80 for use in generating an approximated beamforming matrix using a linear filter in an embodiment of the present invention. The method 80 may be used, for example, as part of the method 70 of FIG. 4. First, a received signal is processed in a linear filter to generate a matrix W (block 82). The rows of the matrix W are then orthogonalized (block 84). Any orthogonalization technique may be used including, for example, QR decomposition, Gram-Schmidt orthogonalization, and/or others. The transpose of the orthogonalized matrix W is then determined to generate matrix U (block 86). The complex conjugate of the matrix U is then determined to form the approximated beamforming matrix for the return channel (block 88).

Figure 6:
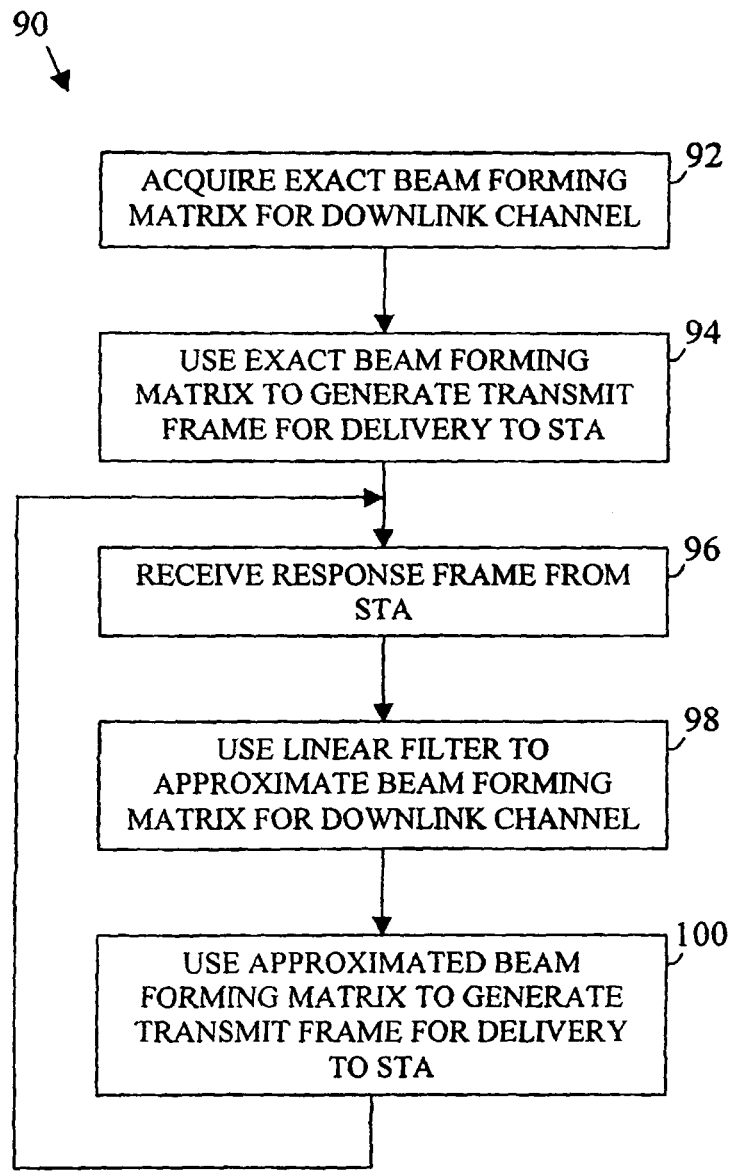
FIG. 6 is a flowchart illustrating an example method for use during a continuous frame exchange in a wireless network in accordance with an embodiment of the present invention.

FIG. 6 is a flowchart illustrating an example method 90 for use during a continuous frame exchange in a wireless network in accordance with an embodiment of the present invention. An exact beamforming matrix is first acquired by an AP for a downlink MIMO channel (block 92). The exact beamforming matrix may be acquired by, for example, a previous training operation. The exact beamforming matrix is then used to generate a transmit frame for delivery to a STA (block 94). A response frame is then received by the AP from the STA (block 96). A linear filter, such as a zero-forcing filter or an MMSE filter, is then used to generate an approximated beamforming matrix for the downlink channel (block 98). The approximated beamforming matrix is then used to generate another transmit frame for delivery to the STA (block 100). The beamforming matrix approximation may then be performed for each subsequent response frame received from the STA until the continuous frame exchange terminates.

The techniques and structures of the present invention may be implemented in any of a variety of different forms. For example, features of the invention may be embodied within laptop, palmtop, desktop, and tablet computers having wireless capability; personal digital assistants having wireless capability; cellular telephones and other handheld wireless communicators; pagers; satellite communicators; cameras having wireless capability; audio/video devices having wireless capability; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, in at least one embodiment, two or more of the blocks in a block diagram are implemented within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
receiving a signal from a remote wireless entity via a MIMO channel, said signal including data that was multiplied by a first beamforming matrix in said remote wireless entity; generating an approximated beamforming matrix for use in an uplink channel to said remote wireless entity, wherein generating an approximated beamforming matrix includes processing said received signal in a linear filter and a beamforming matrix estimator, wherein the linear filter generates a matrix W that is an inverse of a combined channel matrix HV, wherein H is a channel matrix of a forward channel from the remote wireless entity and V is a first beamforming matrix; and generating transmit signals for transmission in the uplink channel to said remote wireless entity from multiple antennas using said approximated beamforming matrix.

2. The method of claim 1, wherein:
said linear filter includes a zero-forcing filter.

3. The method of claim 1, wherein:
said linear filter includes a minimum mean square error (MMSE) filter.

4. The method of claim 1, wherein:
generating an approximated beamforming matrix includes processing said inverse of said combined channel matrix using row orthogonalization, a transpose function, and a conjugate function in the beamforming matrix estimator to form said approximated beamforming matrix.

5. The method of claim 1, wherein:
said first beamforming matrix is an exact beamforming matrix.

6. The method of claim 1, wherein:
said linear filter is used in open loop MIMO receive functions.

7. A method comprising:
acquiring an exact beamforming matrix at a first wireless entity for a MIMO channel between said first wireless entity and a second wireless entity;
using said exact beamforming matrix to transmit a first frame from said first wireless entity to said second wireless entity through said MIMO channel;
receiving a response frame at said first wireless entity from the second wireless entity;
generating an approximated beamforming matrix for said MIMO channel using said response frame, wherein generating includes processing said response frame in a linear filter and a beamforming matrix estimator, wherein the linear filter generates a matrix W that is an inverse of a combined channel matrix HV by processing said received signal in said linear filter, wherein H is a channel matrix of a forward channel from the remote wireless entity and V is a first beamforming matrix, said response frame including data that was multiplied by the first beamforming matrix in the second wireless entity; and using said approximated beamforming matrix to transmit a second frame in an uplink channel from said first wireless entity to said second wireless entity.

8. The method of claim 7, wherein:
said linear filter includes a zero-forcing filter.

9. The method of claim 7, wherein:
said linear filter includes a minimum mean square error (MMSE) filter.

10. The method of claim 7, wherein:
acquiring an exact beamforming matrix includes receiving training data at said first wireless entity, using said training data to determine a channel matrix for said MIMO channel, and performing a singular value decomposition of said channel matrix.

11. The method of claim 7, wherein:
generating an approximated beamforming matrix includes generating an inverse of a combined channel matrix by processing said received response frame in said linear filter.

12. The method of claim 11, wherein:
generating an approximated beamforming matrix includes processing said inverse of said combined channel matrix using row orthogonalization, a transpose function, and a conjugate function in the beamforming matrix estimator to form said approximated beamforming matrix.

13. The method of claim 7, wherein:
said response frame was processed by an approximated beamforming matrix for a reverse direction MIMO channel before being transmitted from said second wireless entity.

14. The method of claim 7, further comprising:
for each new response frame received at said first wireless entity from said second wireless entity, generating another approximated beamforming matrix for said MIMO channel using said new response frame, wherein generating includes processing said new response frame in a linear filter.

15. The method of claim 14, further comprising:
periodically checking for crosstalk in an output matrix of said linear filter; and
generating an exact beamforming matrix using singular value decomposition when crosstalk is detected that exceeds a predetermined level.

16. An apparatus comprising:
a linear filter to process signals received from a wireless MIMO channel, said received signal including data that was multiplied by a first beamforming matrix in a remote wireless entity, said linear filter to output a matrix W during closed loop MIMO operation, wherein the matrix W is an inverse of a combined channel matrix HV that is generated by processing said received signals in said linear filter, wherein H is a channel matrix of a forward channel from the remote wireless entity and V is the first beamforming matrix; and
a beamforming matrix estimator to generate an approximated beamforming matrix for an uplink MIMO channel using said matrix W.

17. The apparatus of claim 16, wherein:
said beamforming matrix estimator includes a row orthogonalizer to orthogonalize the rows of said matrix W, a matrix transpose function to generate a transpose of said matrix W, and a matrix conjugate function to generate a conjugate matrix of said matrix W.

18. The apparatus of claim 16, wherein:
said linear filter includes a zero-forcing filter.

19. The apparatus of claim 16, wherein:
said linear filter includes a minimum mean square error (MMSE) filter.

20. The apparatus of claim 16, wherein:
said linear filter is also operative for use during open loop MIMO operation.

21. The apparatus of claim 16, further comprising:
a transmit subsystem to generate transmit signals for transmission into said return MIMO channel via multiple antennas, said transmit subsystem to receive said approximated beamforming matrix and to use said approximated beamforming matrix to generate said transmit signals.

22. A system comprising:
a plurality of dipole antennas;
a linear filter to process signals received from a wireless MIMO channel by said plurality of dipole antennas, said received signal including data that was multiplied by a first beamforming matrix in a remote wireless entity, said linear filter to output a matrix W during closed loop MIMO operation, wherein the matrix W is an inverse of a combined channel matrix HV that is generated by processing said received signals in said linear filter, wherein H is a channel matrix of a forward channel from the remote wireless entity and V is the first beamforming matrix; and
a beamforming matrix estimator to generate an approximated beamforming matrix for an uplink MIMO channel using said matrix W.

23. The system of claim 22, wherein:
said beamforming matrix estimator includes: a row orthogonalizer to orthogonalize the rows of said matrix W, a matrix transpose function to generate a transpose of said matrix W, and a matrix conjugate function to generate a conjugate matrix of said matrix W.

24. The system of claim 22, wherein:
said linear filter includes a zero-forcing filter.

25. The system of claim 22, wherein:
said linear filter includes a minimum mean square error (MMSE) filter.

26. An article comprising a non-transitory machine readable storage medium having instructions stored thereon that, when executed by a computing platform, operate to:

receive a signal from a remote wireless entity via a MIMO channel, said signal including data that was multiplied by a first beamforming matrix in said remote wireless entity;

generate an approximated beamforming matrix for use in an uplink channel to said remote wireless entity, wherein operation to generate an approximated beamforming matrix includes operation to cause said received signal to be processed in a linear filter and a beamforming matrix estimator, wherein the linear filter generates a matrix W that is an inverse of a combined channel matrix HV by processing said received signal in said linear filter, wherein H is a channel matrix of the forward channel from the remote wireless entity and V is the first beamforming matrix; and generate transmit signals for transmission in the uplink channel to said remote wireless entity from multiple antennas using said approximated beamforming matrix.

27. The article of claim 26, wherein:
said linear filter includes a zero-forcing filter.

28. The article of claim 26, wherein: operation to generate said approximated beamforming matrix includes operation to (a) orthogonalize said inverse of said combined channel matrix; (b) generate a transpose of said inverse of said combined channel matrix; and (c) generate a conjugate of said inverse of said combined channel matrix.

* * * * *